Jan. 19, 1954 C. F. GERLACH 2,666,905

TUNING DEVICE

Filed June 24, 1950 2 Sheets-Sheet 1

INVENTOR
CARL F. GERLACH
By
Toulmin & Toulmin
ATTORNEYS

TUNING DEVICE

Filed June 24, 1950 2 Sheets-Sheet 2

INVENTOR
CARL F. GERLACH
By Toulmin & Toulmin
ATTORNEYS

Patented Jan. 19, 1954 2,666,905

UNITED STATES PATENT OFFICE 2,666,905

TUNING DEVICE

Carl F. Gerlach, Chicago, Ill., assignor to The Triplett Electrical Instrument Company, Bluffton, Ohio, a corporation of Ohio Application June 24, 1950, Serial No. 170,157

5 Claims. (Cl. 336—15)

The present invention relates to oscillatory circuits and apparatus therefor, more particularly to the inductance element thereof.

When dealing with ultra-high frequency oscillatory circuits using tuned circuits, it is extremely difficult to simulate pure, or even substantially pure, capacitance, inductance or resistance. The reason for this is that all condensers include some resistance, and all inductances include not only resistance, but also distributed and perhaps lumped capacitance. These factors, i. e. the impurity or the lack of absolute values of these circuit elements as the frequency is increased causes greater reactive losses, and to some extent, heating losses, in proportion to the increment of frequency.

It is well known that the effects of reactive components can be calculated mathematically, but the embodiment of these components and the adaptation of these calculations to physical structure are very difficult, if not impossible, to attain.

The difficulties are even more enhanced when it is desired to change the tuning constants either up or down, as the apparatus which is employed to provide the variation in one or more of these constants may introduce its own error or divergence from the pure reactive values.

Various ways have been proposed to change the inductance value of a given coil and some of these devices employ a contact which slides over the convolutions of the coil. But this contact, which necessarily gives rise to minute sparking, causes noise in the associated circuits, particularly in the case of high-gain systems. Furthermore, the sliding effect of these contacts causes wear at the contact, as well as on the coil.

Other forms of variable inductors employ a movable iron core inside a coil. But in this case, as in the use of the slidable contact, the movement of the control knob is in a straight line which does not lend itself to knob operation from a panel. Besides, the movable iron core structure imposes limitations in the range of inductance covered and also in frequency response at the higher ranges.

The primary object of the invention is to provide a variable inductance covering an extremely wide range of inductance without the aforesaid noise and frequency limits.

Another object is to provide an improved reactive element, specifically an inductance, in which the inductance can be increased or decreased in an accurate predetermined manner over a wide range and without introducing any appreciable change in resistance in the inductive element, regardless of the change in magnitude of the inductance.

Another object is to provide an improved variable inductive reactive element suitable for use in connection with tuned or filter circuits and in which the inductance can be varied over a wide or a narrow range in an accurate predetermined manner without introducing undue distributive capacity or resistance.

Still another object is to provide a tuning device including an improved inductive element formed of a coil of wire or strip in which the changes of inductance exhibited by the coil is accomplished without the use of sliding contacts or other source of sparks which might give rise to noise within the circuits associated with the tuning device.

A further object is to provide a tuner for oscillatory circuits employing ultra-high frequency in which the inductive reactor is constituted of a drum containing the inductive coil and the arrangement is such that when the inductance is to be changed the surplus or deficiency of wire is obtained from a second drum operated in synchronism with the first drum, and in which the wire to be supplied or taken away from the inductance is maintained taut.

Another object is to provide a modified form of the improved reactor, shown as of the pancake type, and in which the resistance and reactance of the surplus wire for adding to or taking away from the pancake reactor remains substantially constant.

A still further object is to provide an improved driving mechanism for changing the constants of the reactor.

Another object is to provide an improved inductance reactor for use in high-gain circuits and in which the coil of wire is mounted on a rotatable support and when the inductance is to be decreased the surplus wire is taken over by a second drum which immediately neutralizes the resistance of this surplus wire. Thus the resistance of the tuning device as a whole remains only the resistance of the wire which is serving as the inductive element.

A still further object is to provide a reactor of the rotary type in which either bare or insulated wire can be employed for the element and the surplus wire is rendered ineffective from the resistance and reactive standpoints, even when the wire is insulated.

Other objects and features will become apparent as the specification is perused in connection with the accompanying drawings, in which:

Figure 8 is a section taken along line 8—8 in Figure 7;

Figure 1:
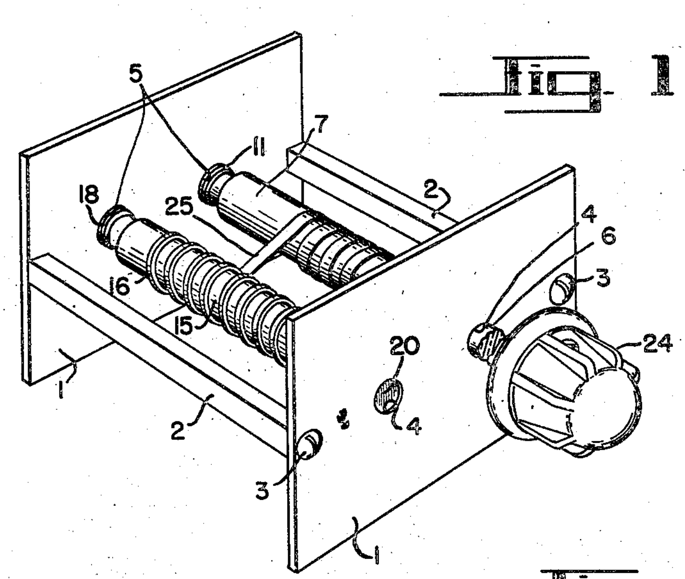
Figure 1 represents a perspective view of the improved inductive reactor.

In the drawings, reference character 1 designates a pair of panels of suitable stiff insulating material spaced apart by rectangularly spaced bars 2 and held in position by end screws 3. Each panel is provided with a pair of spaced openings 4, 5. A shaft 6 made of plastic extends through one of the openings 4 into a metal rod or drum 7, which is silver-plated, as indicated at *7a*, for reasons described hereinafter. The shaft extends only for a limited distance within the drum.

A driving gear 8 is secured to the end of the drum in any suitable manner, this gear being spaced from the panel 1 by a washer 9. The drum at the opposite end is provided with a recess 10 for receiving the rounded end of a threaded member 11 which projects through one of the openings 5 in the panel 1 and is screwed in place by means of a nut 12. A hollow terminal pin 13 is secured to the threaded element 11 for receiving the conductor of an associated high frequency circuit. A contact strip 14 is inserted between the nut 12 and the panel.

There is another drum 15 located parallel to the drum 7. This drum is made preferably of an insulating material such as plastic and is provided with a progressively moving and interconnected shoulder 16 having square edges similar to a square thread. The drum 15 between these threaded shoulders has a diameter preferably exactly the same as the diameter of the drum 7, for reasons as will appear presently.

A metal plug 17 is pressed into the end of the drum, the latter being hollow for receiving the rounded end of a threaded element 18 which extends through the other opening 5 in the panel 1. A nut and a hollow terminal pin and a contact strip are provided on the end of this threaded element, as in the case of the companion element 11.

The drum 15 is journaled at the other end on a metal bushing 19 which extends into the drum and is provided with a short shaft 20 which extends through the opening 4 in the panel 1. A driving gear 21 is carried on the bushing 19 and this gear is spaced from the panel 1 by means of a washer *21a*. The driven gear 21 is in meshing engagement with the gear 8.

One suitable way of securing the gear to the drum is to form a cap member 22 on the gear by means of a wound narrow strip of metal, one end of which enters the material of the drum 15 and the other end is secured to a pin 23 driven into the gear. Thus, when the shaft 6 is rotated by a hand knob 24, the gear 8 drives the gear 21 and the drums 7 and 15 rotate in opposite directions.

Figure 4:
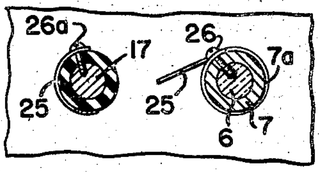
Figure 4 is a section taken along line 4—4 in Figure 2.
Figure 3:
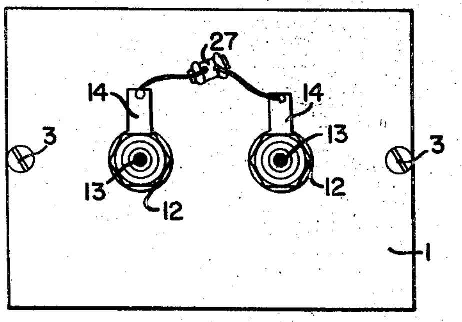
Figure 3 represents a view from the end opposite the hand-operated knob.

There is a ribbon or coil 25 of any suitable non-oxidizing and fairly soft metal, such as silver, secured by means of a screw 26 to the metal drum 7 and wound about this drum. This metal strip is caused to pass around the underside of the drum 15 between the shoulders 16 and is secured at its remote end by a screw pin *26a* threaded into the plug 17 (Fig. 4). The distance between the shoulders 16 is substantially the same as the width of the strip. Thus, as the knob 24 is rotated in the counter-clockwise direction (as seen in Fig. 1), the strip 25 will leave the silver-plated drum 7 at the same rate as the strip is wound onto the drum 15 so that the free length of strip between the drums will always be taut. This is particularly so since, as stated hereinbefore, the diameter of the drum at the base of the shoulders 16 is the same as the diameter of the silver-plated drum 7. A small fixed condenser 27 may be connected, preferably by stiff wires, to the contact strips 14.

In operation, incoming and outgoing leads are connected to the terminal pins 13 respectively, and these leads may be constituted of a high-gain thermionic tube circuit used, for example, in high frequency systems. The ribbon 25 that is wound around the drum 15 constitutes an inductive element which, together with the condenser 27, effects an oscillatory circuit. In order to change the frequency to which the circuit will respond, it is necessary merely to rotate the knob 24 either to the right or left, depending on whether the inductance is to be decreased or increased in order to provide the necessary electrical constants of the circuit.

When it is desired to increase the inductance, the drum 15 is rotated in such direction as to add additional turns of the strip 25, the extra length of strip being unwound from the drum 7. However, when the inductance is to be reduced, the excess turns of the metal strip are taken up by the drum 7 by rotating the knob 24 and the lengthwise resistance of the surplus strip is neutralized by the highly conducting effect of the silver plate on the drum 7. Thus, there is no effective resistance of this surplus wire or strip and the latter obtains its resistance effective only after leaving the drum 7 and any resistance in the inductive element on the drum 15 is due solely to the length of the strip material on the drum and the short length of material spanning the drums. This length is always constant and therefore cannot introduce any resistance variables into the changes of inductance that are obtained when rotating the knob 24.

Heretofore it has been the custom to change inductance by the use of a sliding contact and this has led to variations in the resistance of the inductance other than the inherent resistance change caused by casting off or taking on additional inductance loops. Thus, the electrical constants of the oscillatory circuit were variable in an unpredictable manner and a smooth transition of the frequency responses of the circuit could not be obtained.

Moreover, minute sparks or other deleterious electrical effects may be occasioned at the switch contact, which effects are greatly amplified in high-gain, high frequency circuits. However, in the improved structure a smooth and predetermined change of inductive effect, even microscopic, can be obtained by simply unwinding one of the drums of its strip of metal and winding the unwound strip onto the other drum, always maintaining the strip portions in a tautened condition.

The shoulders or ridges 16 on the insulating drum 15 cause the strip 25 to lay itself around the drum in a strictly equidistant spacing so that no capacity variants are introduced when changing the amount of inductance. It is further apparent that the equal spacings between the convolutions of the strip 25 on the drum 15 also constrain the strip convolutions on the drum 7 to become equally spaced and these effects all tend to provide smoothness of operation but more particularly to minimize any and all sources of vagrant oscillations or changes of electrical constants. While wire of circular cross-section can be satisfactorily used as the inductive element, I prefer a flat ribbon, as illustrated, in order to reduce the thickness of the metal and make it more pliable without decreasing its current-carrying cross-section. The greater dimension of the cross-section of the strip should extend in the same direction as the length of the drums. Thus, the ribbon will always lie flatwise and tight against the surface of each drum, thus further insuring strict reproducibility of the inductive conditions and uniformity of variation as the knob 24 is rotated.

Figures 5, 6:
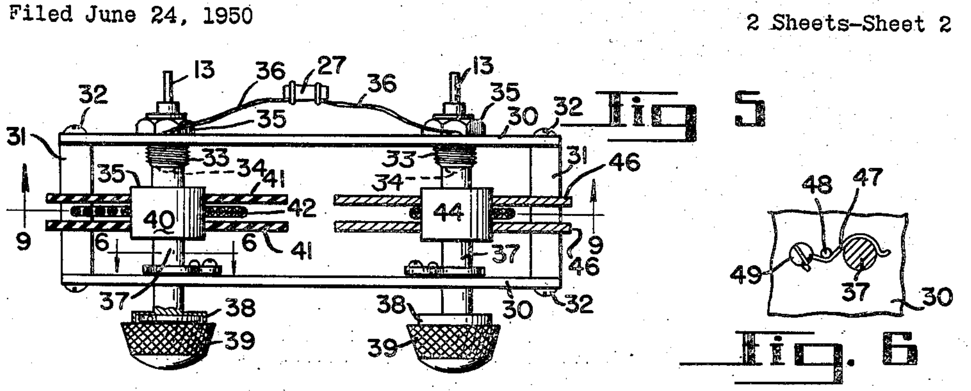
Figure 5 represents a view, partly in plan and partly in section, of a modified form of the improved reactor.
Figure 6 shows a typical form of braking mechanism which may be used to advantage in the structure of Figure 5; this view was taken along line 6—6 in Figure 5.

The improved reactor may take the form of a pancake type of coil as shown in Fig. 5. In this figure reference character 30 designates a pair of spaced rectangular plates held together by spacers 31 and screws 32. There is a pair of openings in each of these plates, the openings in the upper plate being adapted snugly to receive the threaded rods 33 which have conical depending portions 34 and are secured to the plate 30 by means of a pair of nuts 35. Wires 36 are connected to the upper nuts 35, these wires being sufficiently rigid to support a radio condenser 27. The threaded elements 33 constitute bearings for a pair of shafts or rods 37 which project through the openings in the lower plate 30. The shafts terminate in enlargements 38 for carrying knurled knobs 39. A drum 40 of insulating material, preferably of thermoplastic, is secured to one of the shafts 37 (the left-hand shaft as shown in Fig. 5) and as seen more clearly in Fig. 9.

Figures 9, 10:
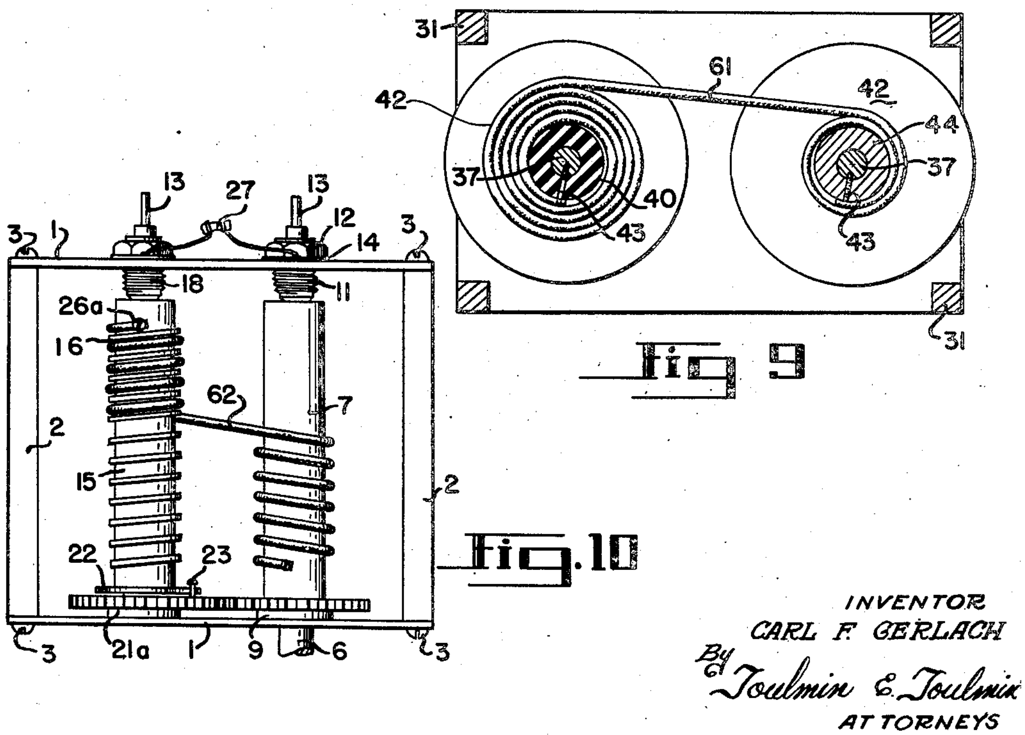
Figure 9 represents a sectional view taken along line 9—9 in Figure 5.
Figure 10 shows a reactor embodying some of the principles of my invention, similar to Figure 2, but employing insulating wire instead of bare metal ribbon.

The shafts 37 have countersunk recesses at their upper ends for receiving the projections 34 of the threaded members 33. As the left-hand knob 39 is rotated, the shaft 37 turns at the bearing 34 and carries with it the drum 40. There is a pair of insulating discs 41 secured to the drum 40 in any suitable manner, these discs being spaced only a short distance apart to accommodate fairly snugly a series of wire convolutions 42 wound, pancake fashion, as can be seen in Fig. 9.

The wire 42 is insulated and the inner end is connected through a threaded pin 43 to the shaft in order to make contact with the pin 13 and the wire 36. A number of turns of the wire 42 is made about the drum 40, these turns being held in radial alignment by the discs 41. The outermost end of the wire 42 is carried to the upper side of a metal drum 44 which is secured to the shaft 37. This shaft passes through one of the openings in the lower plate 30 and is journaled at its upper end on the projection 34. The innermost convolution of the wire 42 is screwed as indicated at 43 (Fig. 9) to the metal drum 44.

There is a pair of metal discs 46 secured to the drum 44 in any suitable and well known manner, and spaced apart a distance as fairly snugly to receive the wire convolutions 42. Thus by rotating the knobs 39, the shafts 37 and the drums 40 and 44 are caused to rotate, and wire is wound or unwound from the discs depending on the particular knob turned and its direction of movement.

Thus, in order to decrease the inductive reactance of the coil on the drum 40, it is simply necessary to rotate the right-hand knob 39 in the clockwise direction to remove wire from the drum 40 but to add wire to the drum 44. The effective resistance of the wire convolutions on the drum 44 remains the same regardless of the number of these convolutions, because the metal discs 46 are positioned so close to the sides of the wire convolutions that a virtual short-circuiting effect of these convolutions is obtained, particularly when employing ultra-high frequency, even though the wire itself does not touch the metal plates, due to the presence of the insulated covering. But the inductive reactance of the convolutions on the drum 40 remains fully effective per convolution, because the discs 41 and the drum 40 are constituted of insulating material. In order to increase the inductive reactance of the convolutions on the drum 40, the left-hand knob 39 (Fig. 5) is rotated counter-clockwise and this will serve to withdraw the required additional length of wire from the supply on the drum 44 to add to the convolutions on the drum 40.

In order that the length of wire which spans the upper sides of the drums 40 and 44 shall remain taut and therefore of constant length so as not unduly to introduce variables into the reactance factors, a braking effect is applied to the shafts 37, 45. This brake may comprise a wire spring 47 which is pressed against the rods or shafts by means of a pin 48 and is held in position by a screw 49 (Fig. 6). Thus, friction is introduced at each of the shafts 37, 45 and the latter turn only in direct response to the movement of the respective knobs 39. There is no over-run as might cause slackness in the convolutions of the wire on either drum or the wire spanning the drums.

It is apparent that the metal discs 46, in offering a practical short-circuit for the convolutions of wire on the drum 44, serve substantially the same purpose as the silver plate on the metal rod 7 in that the resistance and reactance of the wire, as it is added to, or subtracted from the drum 44 remains substantially constant and this resistance or reactance becomes effective only when the wire reaches the adjacent drum 40.

Figure 7:
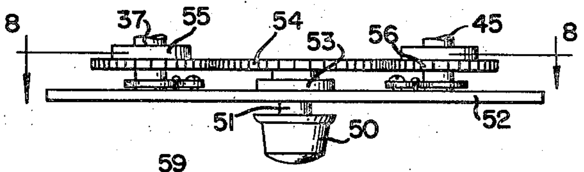
Figures 7 and 8 illustrate another form of driving mechanism which can be used in the structure of Figure 5, particularly when a single knob for driving in both directions is desirable.

Instead of employing a pair of knobs 39 for winding and unwinding the wire convolutions on the drums 40, 44, I may employ a single knob or dial for this purpose. Thus, in Fig. 7, the knob 50 serves, through a clutching and de-clutching arrangement which will be described presently, to move the shafts 37, 45 in the proper directions depending on whether it is desired to increase the inductive reactance of the wire on the drum 40, or to decrease the same.

In this figure, a shaft 51 is taken through a panel 52 of insulating material and a collar 53 is secured to the shaft on the rear side of the panel. The collar carries a gear 54 which meshes with gears 55, 56 secured through a clutching arrangement to the respective shafts 37. The clutches are formed of discs 57 secured to the shafts (Fig. 8), the discs being provided with peripheral notches 58, of which one edge forms a curved surface and the other edge is abrupt or substantially radial. These edges are arranged in reverse relation as between the two discs, and as shown in this figure, there are three balls or rollers 59 positioned within the respective notches of each disc.

Figure 8:
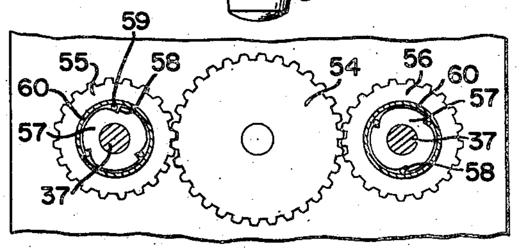

A cylinder 60 surrounds the discs 57 to hold the balls or rollers 59 in place and the gears 55, 56 are secured to these cylinders. Thus, by rotating the knob 50, for example in the counter-clockwise direction (as seen in Fig. 8), the gear 55 will turn clockwise but the shaft 37 will not rotate. But under the same conditions, the gear 56 would rotate in the clockwise direction and since the notches in the disc 57 are reverse from those in the adjacent disc, the balls 59 will now ascend the curved portions of the notches and will become wedged temporarily between the right-hand disc 57 and the cylinder 60 in order to drive the disc and its shaft.

Thus as the knob 50 is rotated counter-clockwise, turns of wire are added to the drum 44, the corresponding wire being removed from the drum 40 to reduce the reactance of the pancake coil. It is obvious that as the knob 50 is turned clockwise, the drum 40 is driven by the left-hand clutch 57 which now becomes engaged at the ball surfaces 59 and the right-hand clutch becomes disengaged. In this case turns of wire are added to the coil wound about the drum 40 to increase the reactance. It has already been pointed out that a drag is imposed on each of the shafts 37, which tends to keep the length of wire 61 spanning the two coils substantially taut.

Figure 2:
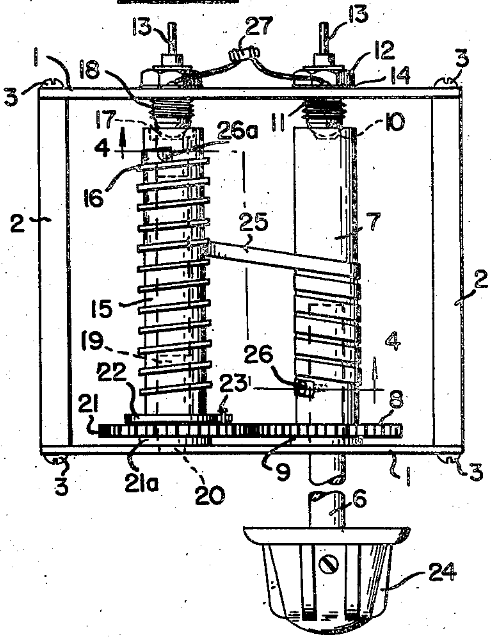
Figure 2 is a plan view of the structure or apparatus.

Referring to the modification shown in Fig. 10, this structure is similar to that shown and described in connection with Fig. 2 and bears the corresponding reference characters except for the wire 62 which is now insulated instead of being a flat, bare conductor. It has been found that at the ultra-high frequencies to which the improved variable conductor is particularly adapted, the capacity between the copper core within the wire and the silver coating on the drum 7 is sufficient to produce a virtual short-circuit between these elements in practically the same manner as if the wire were bare and actually contacted the silver coating. The operation of the structure shown in Fig. 10 is substantially the same as that described in connection with Fig. 2.

While the apparatus disclosed and described herein constitutes a preferred form of the invention, yet it will be understood that alterations can be made without departing from the spirit of the invention, and that those modifications that fall within the scope of the appended claims are intended to be included herein.

Having thus fully described my invention, what I claim as new and desire to secure by Letters Patent, is:

1. A tuning device comprising parallelly disposed panels, a pair of parallelly disposed cylindrical drums rotatably mounted between said panels, intermeshing gears secured to the ends of said drums, and means for rotating the drums in opposite directions including a hand knob fixed to one of said drums, a continuous length of flat bare wire wound on said drums and spanning the distance between the drums, said drum to which the hand knob is secured having a metallized surface which contacts with the flat surface of the surrounding turns of wire, and the adjacent drum being constituted of insulating material, and means on one of said drums for equidistantly spacing the turns of wire along each of said drums, whereby as said knob is rotated the number of turns of wire on said drums is changed in the inverse relation to the change in the inductance of the wire on the insulating drum, but the total overall length of wire on the two drums remains the same.

2. A tuning device comprising parallelly disposed panels, a pair of parallelly disposed cylindrical drums of equal diameter rotatably mounted between said panels, intermeshing gears secured to the ends of said drums, and means for rotating the drums in opposite directions including a hand knob affixed to one of said drums, a continuous length of flat bare wire wound on said drums and spanning the distance between the drums, said drum to which the hand knob is secured having a metallized surface which contacts with the flat surface of the surrounding turns of wire, and the adjacent drum being constituted of insulating material, and means for equidistantly spacing the turns of wire along said last mentioned drum, whereby as said knob is rotated the number of turns of wire on said metallized drum is changed in the inverse relation to change the inductance of the wire on the insulating drum, but the total overall length of wire on the two drums remains the same, said spacing means being constituted of spirally arranged shoulders on the drum of insulating material to leave recesses, said wire being received in said recesses and lying flatly against the surface of said adjacent drum when the knob is operated and wire is transferred from the metallized drum to the drum of insulating material.

3. A tuning device comprising spaced parallelly disposed panels, a pair of cylindrical drums of equal diameter rotatably mounted between said panels, said drums being geared together to rotate in opposite directions, a flat bare wire of constant length being wound over and between the drums whereby as said drums are operated, one drum will give up as many turns of wire as the adjacently disposed drum takes on turns to leave the wire spanning the drums in a taut condition, one of said drums having a highly conductive surface and the other of said drums having a strictly insulating surface, said wire lying flatwise against said surfaces and in electrical contact with said conductive surface whereby the turns surrounding the conductive drum are short-circuited but the turns surrounding the drum of insulating material have a resistance proportional to the peripheral length of the turns on the last mentioned drum, and means for equidistantly spacing said last mentioned turns from one another in order to provide inductive reactance when coupled to a high frequency circuit, and hand operated means for rotating either one of said drums in order to cause the value of inductance to be varied as the drum of insulating material takes on or casts off turns and these turns are supplied from or to the drum having a highly conductive surface.

4. A tuning device comprising parallelly disposed panels, a pair of drums of equal diameter rotatably mounted between said panels, gear means for rotating said drums in opposite directions, a piece of flat bare silver wire of constant size and length being wound on both of said drums and spanning the drums at a position midway between the ends of the wire, one of said drums being constituted of insulating material and means on said insulated drum for equidistantly spacing the turns along the last mentioned drum, and the other of said drums being coated with a layer of silver, said wire lying flatly against said other drum in intimate electrical contact therewith whereby the lengthwise resistance of those turns surrounding the last mentioned drum is substantially zero.

5. A tuning device comprising parallelly disposed panels, a pair of parallelly disposed cylindrical drums rotatably mounted between said panels, inter-meshing gears secured to the ends of said drums, and means for rotating said drums in opposite directions including a hand knob affixed to one of said drums, a continuous length of thin flat bare wire wound on said drums and spanning the distance between the drums, said drum to which the hand knob is secured having a metallized surface which contacts with the surrounding turns of wire, and the adjacent drum being constituted of insulating material, and means for equidistantly spacing the turns of wire along said last mentioned drum, whereby as said knob is rotated the number of turns of wire on said metallized drum is changed in the inverse relation to the change in inductance of the wire on the insulating drum, but the total overall length of wire on the two drums remains the same, said spacing means being constituted of spirally arranged shoulders on the drum of insulating material to leave recesses of a width as will snugly receive the convolutions of wire when the knob is operated and wire is transferred from the metallized drum to the drum of insulating material, said wire being formed of a ribbon having a rectangular cross-section with the greater dimension lying flatwise against the surfaces of said drums and between the said spirally arranged shoulders.

CARL F. GERLACH.

References Cited in the file of this patent

UNITED STATES PATENTS

| Number | Name | Date |
|---|---|---|
| 1,158,123 | Fessenden | Oct. 26, 1915 |
| 1,668,414 | Martin | May 1, 1928 |
| 1,936,671 | Hurt | Nov. 28, 1933 |
| 1,977,291 | Scofield | Oct. 16, 1934 |
| 2,223,080 | Swarbrick | Nov. 26, 1940 |

FOREIGN PATENTS

| Number | Country | Date |
|---|---|---|
| 93,679 | Switzerland | Mar. 16, 1922 |
| 31,773 | Netherlands | Aug. 15, 1933 |
| 728,756 | France | Dec. 23, 1941 |